(12) United States Patent
Osakabe et al.

(10) Patent No.: US 8,970,930 B2
(45) Date of Patent: Mar. 3, 2015

(54) SHEET CONVEYING DEVICE CAPABLE OF PREVENTING EDGES OF SHEET FROM CURLING

(71) Applicants: Yoshinori Osakabe, Seto (JP); Masayoshi Oosaki, Nagoya (JP); Katsuro Miura, Toyota (JP); Tsuyoshi Suganuma, Nagoya (JP)

(72) Inventors: Yoshinori Osakabe, Seto (JP); Masayoshi Oosaki, Nagoya (JP); Katsuro Miura, Toyota (JP); Tsuyoshi Suganuma, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/936,472

(22) Filed: Jul. 8, 2013

(65) Prior Publication Data

US 2014/0009804 A1 Jan. 9, 2014

(30) Foreign Application Priority Data

Jul. 9, 2012 (JP) ................................. 2012-153967

(51) Int. Cl.
*H04N 1/04* (2006.01)
*H04N 1/00* (2006.01)
*H04N 1/12* (2006.01)
*H04N 1/193* (2006.01)

(52) U.S. Cl.
CPC ....... *H04N 1/00647* (2013.01); *H04N 1/00588* (2013.01); *H04N 1/00591* (2013.01); *H04N 1/00618* (2013.01); *H04N 1/00636* (2013.01); *H04N 1/00652* (2013.01); *H04N 1/00978* (2013.01); *H04N 1/12* (2013.01); *H04N 1/193* (2013.01); *H04N 2201/0081* (2013.01)
USPC ........................... 358/498; 358/497; 358/474

(58) Field of Classification Search
USPC .................................. 358/498, 497, 496, 474
See application file for complete search history.

(56) References Cited

U.S. PATENT DOCUMENTS 7,953,341 B2 * 5/2011 Tobinaga et al. ................ 399/92
2004/0217541 A1 * 11/2004 Horio ............................ 271/121

FOREIGN PATENT DOCUMENTS

| JP | 2002-185710 A | 6/2002 |
| JP | 2003-023514 A | 1/2003 |
| JP | 2005-289626 A | 10/2005 |

* cited by examiner

*Primary Examiner* — Houshang Safaipour
(74) *Attorney, Agent, or Firm* — Banner & Witcoff, Ltd.

(57) ABSTRACT

A sheet conveying device includes: a conveying unit; and a controller. The conveying unit is configured to convey a sheet along a conveying path. The sheet has a leading edge and a trailing edge. The conveying path includes a segment that is curved. The controller is configured to control the conveying unit to convey the sheet, determine whether or not a halting condition for halting conveyance of the sheet is met, and halt, if the halting condition is met, conveyance of the sheet when one of the leading edge and the trailing edge of the sheet is positioned in a segment of the conveying path different from the segment that is curved.

14 Claims, 12 Drawing Sheets

US 8,970,930 B2

SHEET CONVEYING DEVICE CAPABLE OF PREVENTING EDGES OF SHEET FROM CURLING

CROSS REFERENCE TO RELATED APPLICATION

This application claims priority from Japanese Patent Application No. 2012-153967 filed Jul. 9, 2012. The entire content of the priority application is incorporated herein by reference.

TECHNICAL FIELD

The present invention relates to a sheet-conveying device in an image-reading device that serves to convey sheets of an original or the like.

BACKGROUND

A conveying path along which a sheet-conveying device of an image-reading device or the like conveys originals often includes segments that are curved or bent. If the sheet-conveying device halts conveyance of a sheet of originals when an edge of the sheet is present in such a curved or bent segment of the conveying path, the edge portion of the sheet will become curved or bent in the shape of the segment in which the edge was halted.

SUMMARY

Therefore, it is an object of the present invention to provide a sheet-conveying device that prevents the edges of a sheet of originals or other sheet from curling into the shape of a curved or bent segment of the conveying path.

In order to attain the above and other objects, the present invention provides a sheet conveying device including: a conveying unit; and a controller. The conveying unit is configured to convey a sheet along a conveying path. The sheet has a leading edge and a trailing edge. The conveying path includes a segment that is curved. The controller is configured to control the conveying unit to convey the sheet; determine whether or not a halting condition for halting conveyance of the sheet is met; and halt, if the halting condition is met, conveyance of the sheet when either one of the leading edge and the trailing edge of the sheet is positioned in a segment of the conveying path different from the segment that is curved.

According to another aspect, the present invention provides an image-reading device including: a conveying unit; a reading unit; and a controller. The conveying unit is configured to convey a sheet along a conveying path. The sheet has a leading edge and a trailing edge. The conveying path includes a segment that is curved and a straight segment. The reading unit is disposed in the straight segment and configured to reading the sheet. The controller is configured to control both the conveying unit to convey the sheet and the reading unit to read the sheet that is conveyed by the conveying unit; determine whether or not a halting condition for halting conveyance of the sheet is met when the reading unit has completed reading the sheet; and halt, if the halting condition is met, conveyance of the sheet when either one of the leading edge and the trailing edge of the sheet is positioned in the straight segment.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
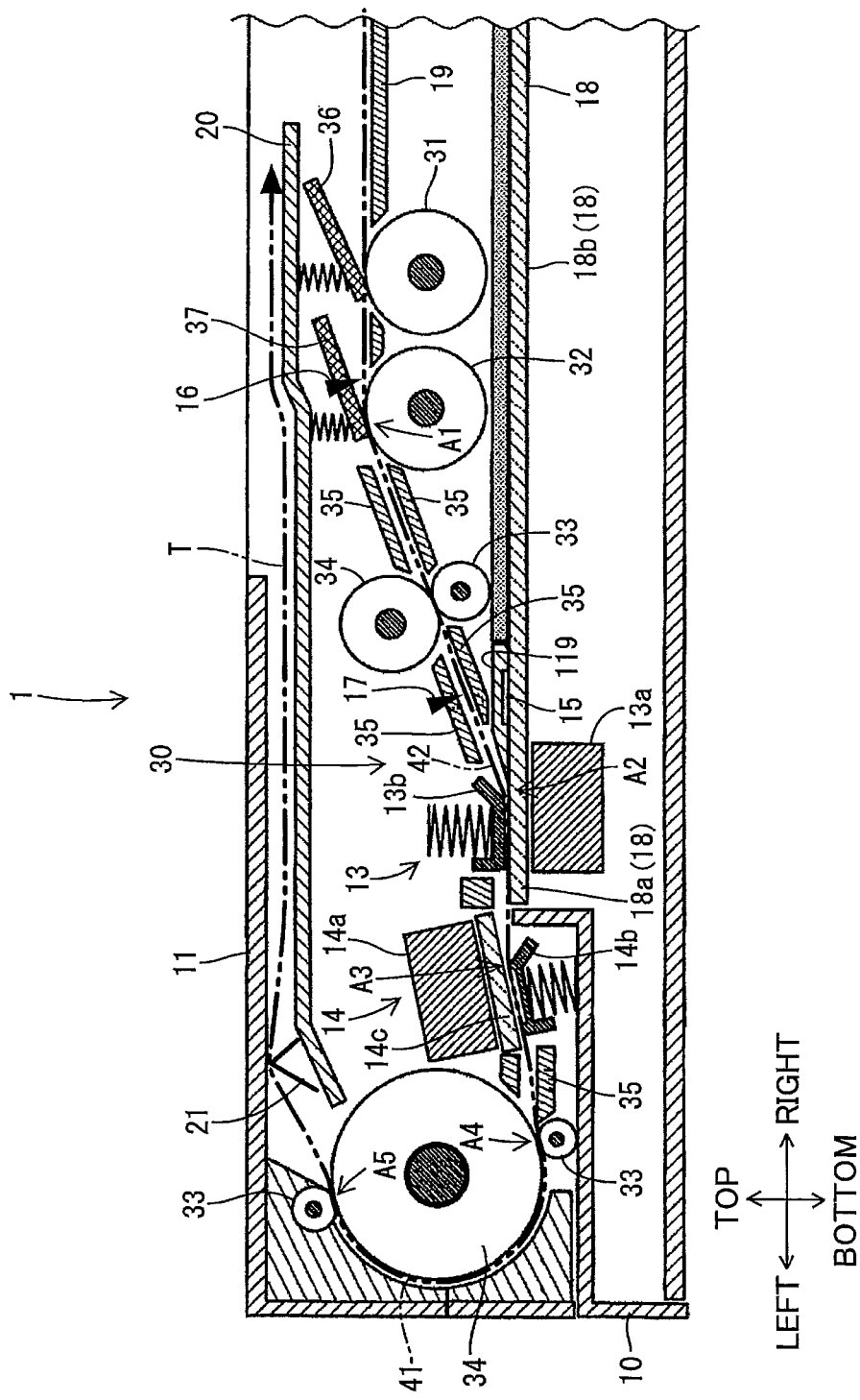
FIG. 1 is a cross-sectional view schematically illustrating a structure of an image-reading device according to a first embodiment.

A sheet-conveying device and an image-reading device according to embodiments of the present invention will be described while referring to the accompanying drawings wherein like parts and components are designated by the same reference numerals to avoid duplicating description.

First Embodiment

Next, a first embodiment of the present invention will be described with reference to FIGS. 1 through 10.

(1) Mechanical Structure of an Image-Reading Device

First, the structure of an image-reading device 1 according to the first embodiment will be described with reference to FIG. 1. The image-reading device 1 is capable of reading both surfaces of originals.

The image-reading device 1 includes a body casing 10, a cover 11, an automatic-document feeder (ADF) 30, a first reading unit 13, a second reading unit 14, a white reference plate 15, and urging units 21.

The body casing 10 has a box-like shape. A first platen glass 18 is provided in the top portion of the body casing 10. A frame member 119 is provided on the top surface of the first platen glass 18 and serves to position a sheet of originals through contact with the edge of the sheet. The frame member 119 also functions to partition the surface of the first platen glass 18 into a first area 18a and a second area 18b. The first area 18a is the area of the first platen glass 18 on the left side of the frame member 119 in FIG. 1, and the second area 18b is the area on the right side of the frame member 119.

The cover 11 is pivotally connected to the body casing 10 so as to be capable of pivotally move between a closed position for covering the first platen glass 18 and an open position for exposing the first platen glass 18. The first platen glass 18 is provided with a sheet tray 19 for supporting sheets of originals to be scanned, the ADF 30, and a discharge tray 20 for receiving sheets conveyed and discharged by the ADF 30.

When a plurality of sheets are loaded in the sheet tray 19, the ADF 30 conveys the sheets continuously along a conveying path T with a gap formed between consecutively fed sheets, and sequentially discharges the sheets onto the discharge tray 20. The ADF 30 includes a supply roller 31, a separating roller 32, a plurality of conveying rollers 34, a plurality of follow rollers 33 contacting respective conveying rollers 34 with pressure so as to follow the rotation of the conveying rollers 34, a plurality of guide members 35 for guiding the conveyed sheets, a separating pad 37, support pad 36, a front sensor 16, and a rear sensor 17.

When a sheet is loaded in the sheet tray 19, the leading edge portion of the sheet contacts the separating roller 32 and separating pad 37. If a plurality of sheets is loaded in the sheet tray 19, the leading edge (downstream edge in the conveying direction) of the separating pad 37 contacts the top surface of the topmost sheet in the sheet tray 19. The separating roller 32 contacts the bottom surface of the bottommost sheet loaded in the sheet tray 19.

When a motor 54 (see FIG. 2) drives the supply roller 31 and separating roller 32 to rotate, the sheet contacted by the separating roller 32 (the bottommost sheet when a plurality of sheets are loaded in the sheet tray 19) is fed onto the conveying path T by the frictional force generated between the separating roller 32 and the sheet. The motor 54 is a stepping motor. Thus, when a plurality of sheets is loaded in the sheet tray 19, the separating roller 32 can separate the sheets so that the sheets are supplied one at a time onto the conveying path T. The motor 54 also drives the conveying rollers 34 to rotate. When a sheet supplied by the supply roller 31 and separating roller 32 reaches the conveying rollers 34, the conveying rollers 34 convey the sheet along the conveying path T and discharge the sheet onto the discharge tray 20.

The front sensor 16 is disposed between the supply roller 31 and separating roller 32. When a sheet is present at a detection position of the front sensor 16, the front sensor 16 outputs a detection signal indicating ON to a control unit 50 (see FIG. 2). When a sheet is not present at the detection position, the front sensor 16 outputs a detection signal indicating OFF to the control unit 50.

The rear sensor 17 is disposed on the conveying path T between the front sensor 16 and first reading unit 13. When a sheet is present at a detection position of the rear sensor 17, the rear sensor 17 outputs a detection signal indicating ON to the control unit 50. When a sheet is not present at the detection position, the rear sensor 17 outputs a detection signal indicating OFF to the control unit 50.

Figure 2:
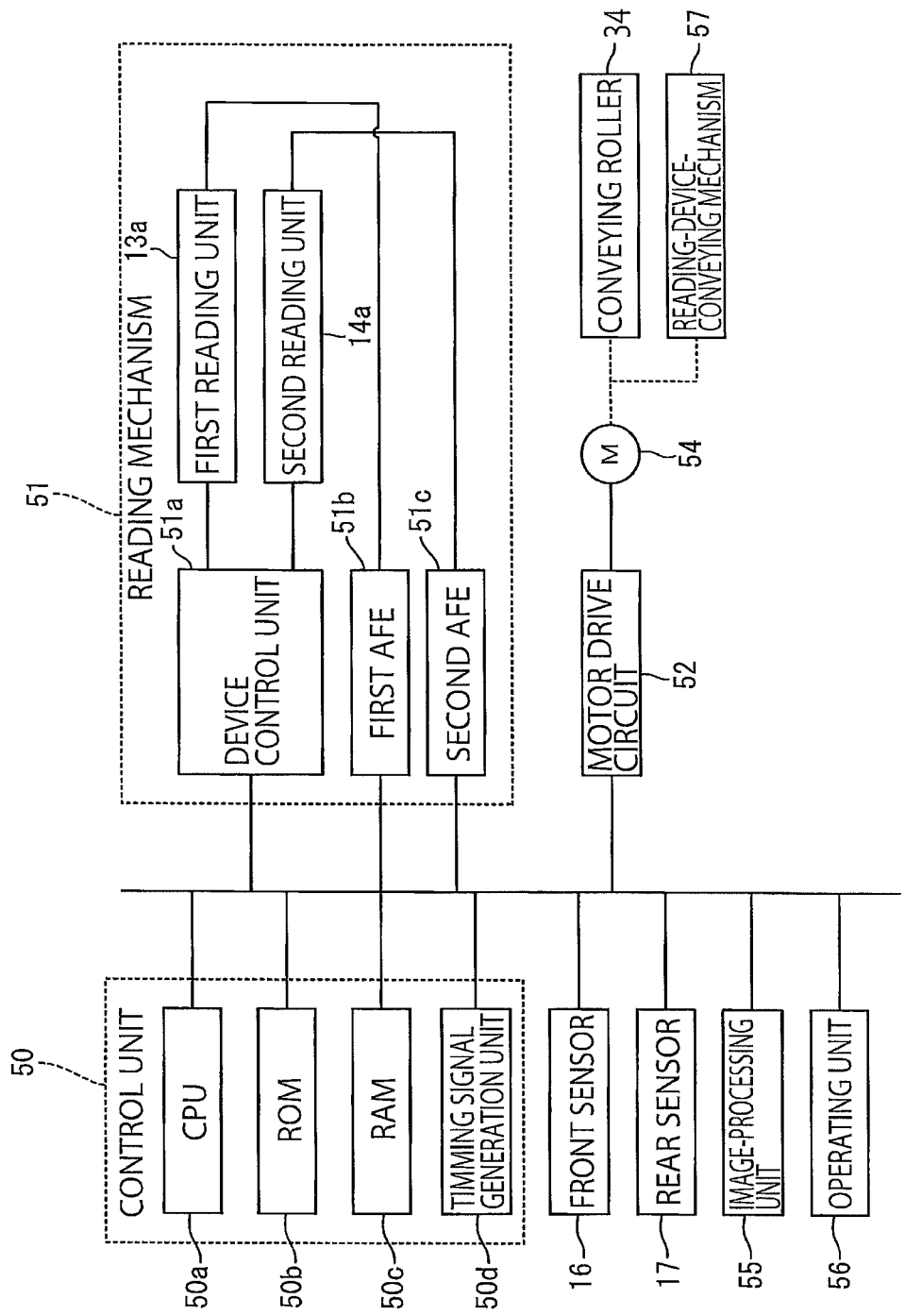
FIG. 2 is a block diagram schematically illustrating an electrical structure of the image-reading device.

The first reading unit 13 includes a first reading device 13a accommodated in the body casing 10, a first sheet-pressing member 13b, and a reading-device-conveying mechanism 57 (see FIG. 2).

The first sheet-pressing member 13b is disposed above the first platen glass 18 in the first area 18a. A spring urges the first sheet-pressing member 13b toward the first platen glass 18. The reading-device-conveying mechanism 57 shown in FIG. 2 functions to convey the first reading device 13a in a sub-scanning direction parallel to the surface of the first platen glass 18. The first reading device 13a is positioned beneath the first platen glass 18. When reading a sheet being conveyed by the ADF 30, the first reading device 13a is disposed in a position opposing the first sheet-pressing member 13b with the first platen glass 18 in the first area 18a interposed therebetween.

The first reading device 13a includes a light source configured of RGB LEDs and the like, an image sensor having a plurality of light-receiving elements arranged linearly in a direction orthogonal to the drawing surface (main scanning direction), an optical system for focusing light reflected off a sheet onto the light-receiving elements of the image sensor, and a carriage for supporting these components. The first reading device 13a reads the surface (first surface) of a sheet being conveyed through the first area 18a of the first platen glass 18 by the ADF 30.

The second reading unit 14 is accommodated in the ADF 30 and includes a second reading device 14a, a second platen glass 14c, and a second sheet-pressing member 14b. The second sheet-pressing member 14b confronts the second platen glass 14c at a position on the opposite side from the second reading device 14a. A spring urges the second sheet-pressing member 14b toward the second platen glass 14c.

The second reading device 14a is disposed along the conveying path T downstream of the first reading device 13a. The second reading device 14a reads the opposite surface (second surface) of the sheet whose surface (first surface) has been read by the first reading device 13a.

The white reference plate 15 is provided on the frame member 119. The white reference plate 15 is a white-colored member with a generally uniform light reflectance. The reading-device-conveying mechanism 57 conveys the first reading device 13a to a position confronting the first platen glass 18 on the opposite side of the first platen glass 18 from the white reference plate 15. By performing a reading operation at this position, the first reading device 13a can acquire correction data for shading compensation.

The urging units 21 are configured of strips of elastic resin film that are folded at a midpoint thereof. The urging units 21 are spaced at intervals in the main scanning direction. One end of each urging unit 21 is fixed inside the cover 11 while the other end is free. The urging units 21 urge a sheet upward at a position shifted slightly toward the leading edge of the sheet from the trailing edge of the same. More specifically, the urging units 21 urge a sheet upward at a position approximately 5 cm from the trailing edge toward the leading edge side of the sheet discharged onto the discharge tray 20, for example, but the position may be adjusted as deemed appropriate. Further, non-elastic members having a chevron (inverted "V") shape may be used in place of the urging units 21.

(2) Insertion Discharge of Original Sheets

Next, an insertion discharge method for discharging sheets will be described with reference to FIG. 3. In this method, sheets are loaded on the sheet tray 19 so that their front surfaces (first surfaces) face downward and their back surfaces (second surfaces) face upward and are sequentially discharged onto the discharge tray 20 so that their front surfaces face upward and their back surfaces face downward. The method will be called insertion discharge because each discharged sheet is inserted underneath the stack of previously discharged sheets.

As described above, when a plurality of sheets is loaded on the sheet tray 19, the separating roller 32 first draws the bottommost sheet onto the conveying path T. The sheet is conveyed along the conveying path T through a semicircularly curved segment 41 and is subsequently discharged onto the discharge tray 20. The sheet passes over the urging units 21 when discharged onto the discharge tray 20, with the urging units 21 urging the trailing edge of the sheet upward at a position approximately 5 cm from the trailing edge toward the leading edge of the sheet. In the embodiments, the curved segment 41 is described as semicircularly curved segment. However, the curved segment 41 is not limited to a semicircularly curved segment, but may be, for example, an S-shaped curved segment, quadrantly curved segment, and the like.

Figure 3:
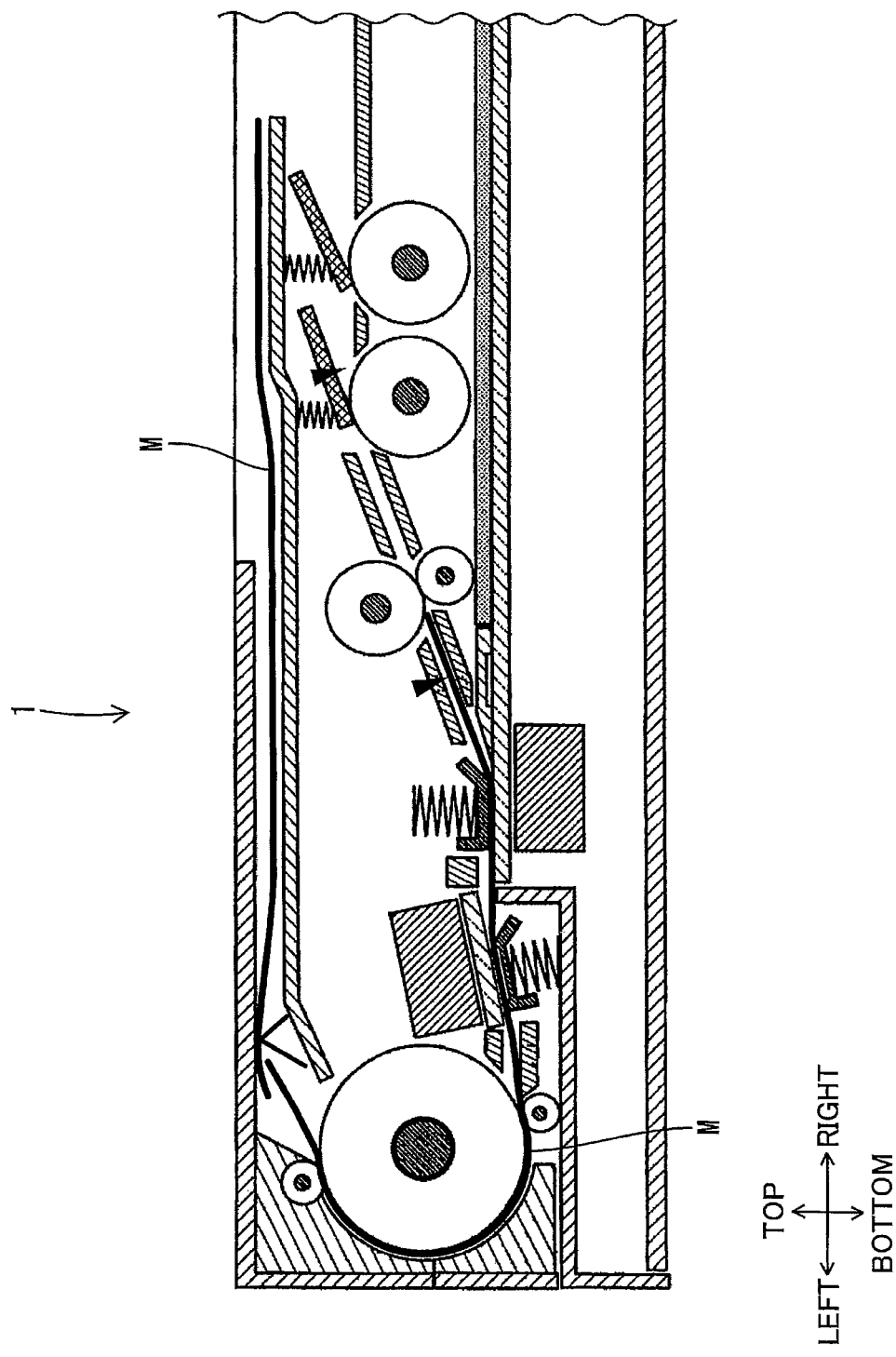
FIG. 3 is a cross-sectional view of the image-reading device in a state where a sheet whose trailing edge is not curled is discharged.

The next sheet is conveyed by the ADF 30 such that its leading edge is inserted beneath the trailing edge of the previously discharged sheet urged upward by the urging units 21, as shown in FIG. 3. Thus, each subsequent sheet discharged onto the discharge tray 20 is beneath the previously discharged sheet.

Accordingly, when the ADF 30 consecutively conveys sheets stacked in the sheet tray 19 and discharges these sheets onto the discharge tray 20, the plurality of sheets are discharged onto the discharge tray 20 such that their top surfaces face upward, and the first discharged sheet is on the top of the stack while the last discharged sheet is on the bottom.

(3) Conveying Path

Next, the conveying path T will be described in greater detail with reference to FIG. 1. The conveying path T includes a semicircularly curved segment 41 (the segment between points A4 and A5) that curves in a semicircle in order to reverse the conveying direction of the sheets, and a remaining segment 42 (the segment between points A1 and A4) on the upstream side of the semicircularly curved segment 41.

The remaining segment 42 includes a plurality of straight segments (the segment between points A1 and A2, the segment between points A2 and A3, and the segment between points A3 and A4) that continue from one to the next while changing angles. In the following description, the remaining segment 42 will simply be referred to as the straight segments 42.

As shown in FIG. 1, the first and second reading devices 13a and 14a are positioned to read sheets in straight segments between points A2 and A3.

Note that the semicircularly curved segment 41 is not necessarily limited to a perfect semicircle, but may include a straight portion, provided that the overall semicircularly curved segment 41 is semicircular in shape, for example. Further, the semicircularly curved segment 41 may be shorter or longer in length than a perfect semicircle having the same radius. For example, the semicircularly curved segment 41 may be set within the range of 75-125% of the length of the semicircularly curved segment 41 having a perfect semicircular shape with the same radius. Further, the semicircularly curved segment 41 may be considered a segment that switches the course of the sheet proceeding in a direction away from the sheet tray 19 to a direction approaching the sheet tray 19.

(4) Electrical Structure of the Image-Reading Device

Next, the electrical structure of the image-reading device 1 will be described with reference to FIG. 2. The image-reading device 1 includes the control unit 50, the front sensor 16, the rear sensor 17, a reading mechanism 51, a motor drive circuit 52, the motor 54, an image-processing unit 55, and an operating unit 56.

The control unit 50 further includes a CPU 50a, a ROM 50b, a RAM 50c, and a timing signal generation unit 50d. The CPU 50a executes various programs stored in the ROM 50b to control the components of the image-reading device 1. Control programs executed by the CPU 50a and various data and the like are stored in the ROM 50b. The RAM 50c is used as the primary storage device when the CPU 50a executes various processes. The timing signal generation unit 50d generates a clock signal and outputs the clock signal to the motor drive circuit 52.

The reading mechanism 51 includes a device control unit 51a, the first reading device 13a, the second reading device 14a, a first analog front end (AFE) 51b, and a second AFE 51c.

The device control unit 51a controls the read timings of the first and second reading devices 13a and 14a and the like in response to commands from the control unit 50.

The first and second AFEs 51b and 51c are circuits that perform gain adjustments and A/D conversion. In other words, the first and second AFEs 51b and 51c adjust the gain of image signals outputted from the first and second reading devices 13a and 14a and convert the adjusted image signals to digital image signals. In the following description, image signals that have undergone A/D conversion will be called scan data. Data outputted from the first and second AFEs 51b and 51c is stored in the RAM 50c.

The motor 54 has a structure well known in the art that includes a rotor (not shown) fixed to a rotational shaft, and a stator (not shown) mounted around the outside of the rotor. The motor drive circuit 52 functions to drive the motor 54. By applying an electric current in sequential pulses to a coil wound about the stator corresponding to an excitation phase, the motor drive circuit 52 can accurately rotate the rotor in units of fixed angles. The excitation phase serves to indicate how the motor drive circuit 52 is to supply electric current to the coil of the motor 54. Thus, the rotated position of the motor (the rotor position) is determined by this excitation phase.

The timing signal generation unit 50d of the control unit 50 inputs a clock signal into the motor drive circuit 52. The motor drive circuit 52 updates the signal indicating the excitation phase for each pulse of the clock signal and supplies current to the coil based on this signal for rotating the motor 54 one step at a time.

The motor 54 drives the supply roller 31, separating roller 32, and conveying rollers 34 of the ADF 30 to rotate.

The image-processing unit 55 reads scan data stored in the RAM 50c that was outputted from the first and second AFEs 51b and 51c. The image-processing unit 55 performs various image processes on the scan data, such as gamma correction and shading compensation, and generates image data having density values for the three RGB colors for each pixel.

The operating unit 56 includes a display device, such as a liquid crystal display, and various buttons that the user manipulates to operate the image-reading device 1. By operating the operating unit 56, the user can set reading conditions, such as a reading range described later, and can input a read start command, for example. The user may also set reading conditions and input read start commands on an external device, such as a personal computer, that is connected to and capable of communicating with the image-reading device 1.

Next, a read control process executed by the control unit 50 will be described. However, before describing steps in the read control process, first temperature increases in the motor 54 will be described.

(5) Temperature Increases in the Motor

The temperature of the motor 54 rises as the motor 54 rotates. If the temperature gets excessively high, the motor 54 may malfunction. Therefore, the control unit 50 monitors a temperature Y of the motor 54 during the read control process and temporarily halts rotation of the motor 54 if the temperature Y of the motor 54 rises above a reference temperature Yk. Halting the motor 54 naturally halts conveyance of the sheet M. The control unit 50 then waits until the temperature Y of the motor 54 drops below the reference temperature Yk before resuming the conveying operation.

Various methods can be employed to detect the temperature Y of the motor 54. For example, a temperature sensor may be used to detect the temperature Y. Alternatively, the temperature Y may be estimated using an equation. Here, an example will be given for estimating the temperature Y based on an equation.

After the power to the image-reading device 1 is turned on, the temperature Y of the motor 54 rises in proportion to the number of pulses in the clock signal inputted into the motor drive circuit 52 and lowers over the passage of time. Therefore, the control unit 50 can estimate the temperature Y based on Equation 1 below.

$$\text{Temperature } Y = a \times \text{pulse number} - b \times \text{time} \quad \text{(Equation 1)}$$

Here, a is a coefficient based on the rotational speed of the motor 54. The number of pulses is counted for various rotational speeds, and the product of the pulse number for a given rotational speed and the coefficient a corresponding to that rotational speed is substituted for "a×pulse number" in the equation. Further, b is a coefficient found according to experiments performed in advance.

(6) Issues Specific to the Embodiment

Figure 4:
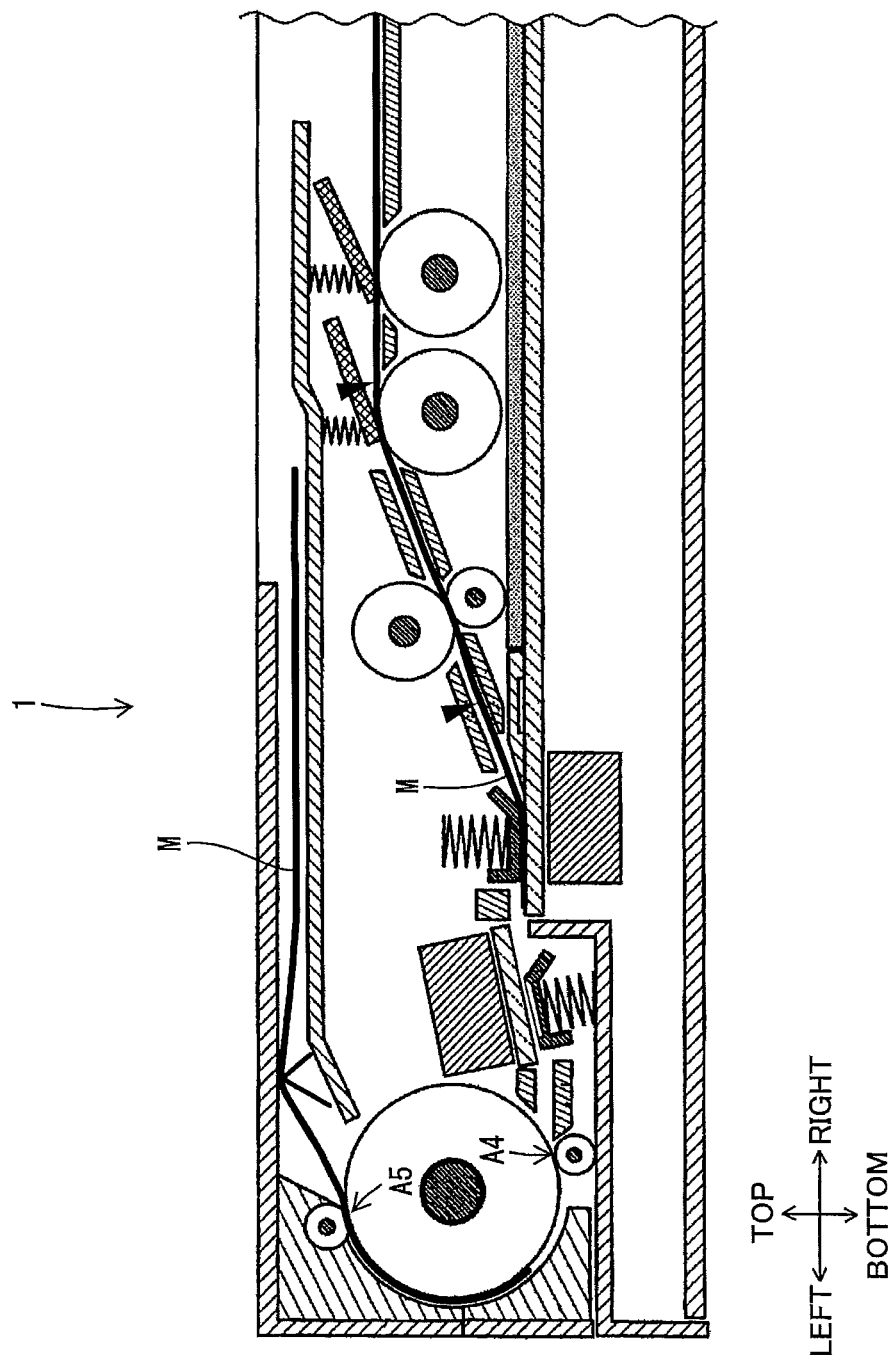
FIG. 4 is a cross-sectional view of the image-reading device in a state where conveyance of a sheet is halted with its trailing edge positioned in a semicircularly curved segment according to a comparative example.

If the rotation of the motor 54 is temporarily halted while conveying the sheet M without considering the position of the trailing edge of the sheet M, the sheet M may come to a stop with its trailing edge positioned in the semicircularly curved segment 41, as shown in the comparative example in FIG. 4. If the sheet M is halted with its trailing edge positioned in the semicircularly curved segment 41, the trailing edge may become curled in a shape conforming to the shape of the semicircularly curved segment 41 while conveyance is stopped.

Figure 5:
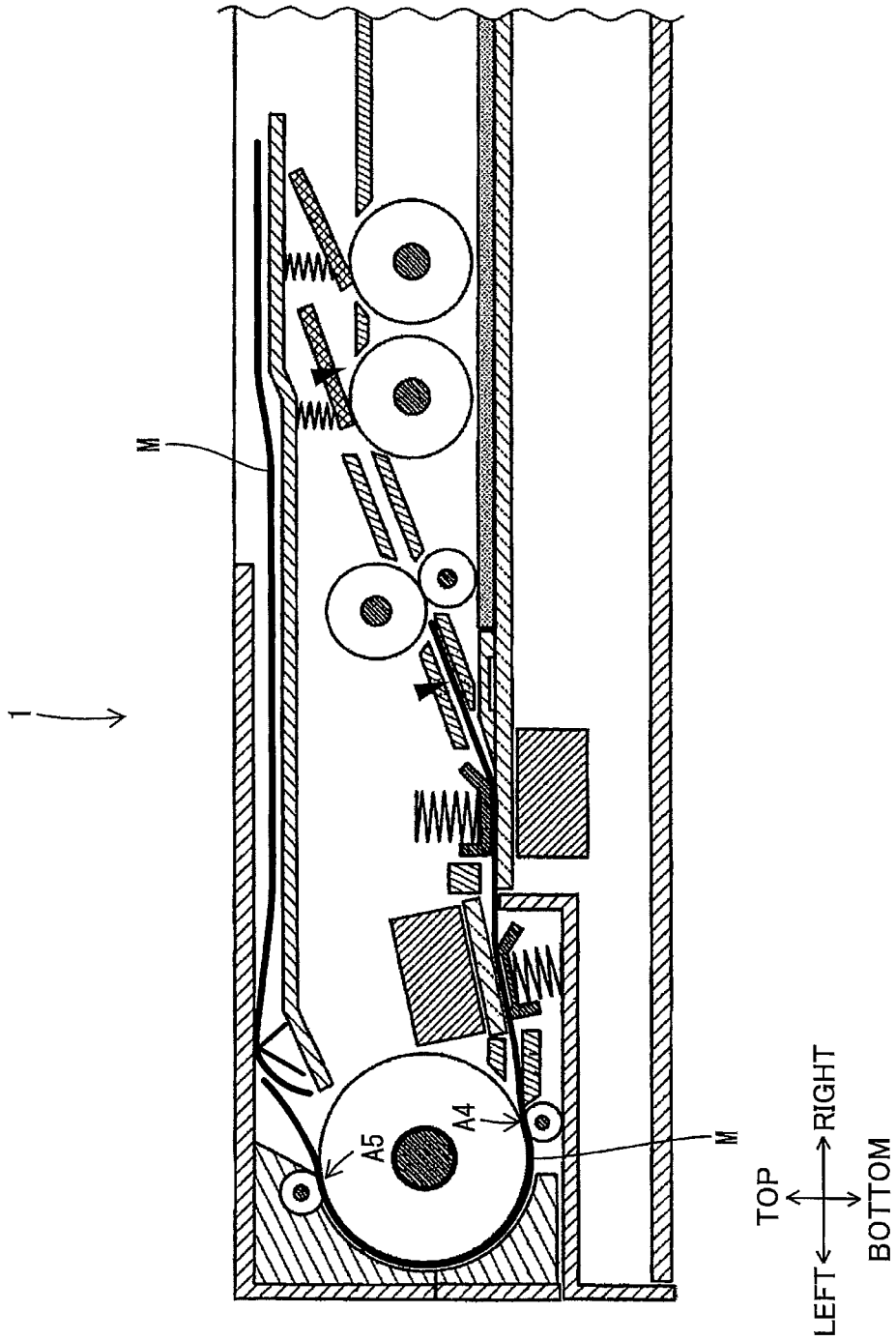
FIG. 5 is a cross-sectional view of the image-reading device in a state where a sheet whose trailing edges is curled is discharged according to the comparative example.

If a sheet M whose trailing edge is curled into the shape of the semicircularly curved segment 41 is discharged prior to discharging another sheet M, the succeeding sheet M may ride up on the trailing edge of the first sheet M, as shown in the comparative example in FIG. 5. Alternatively, the succeeding sheet M may push against the trailing edge of the first sheet M, pushing the first sheet M off the discharge tray 20. Alternatively, the first sheet M may block progress of the succeeding sheet M, resulting in a paper jam.

When a plurality of sheets is discharged consecutively onto the discharge tray 20, the first discharged sheet should end up on the top of the stack and the last discharged sheet should end up on the bottom. However, when the trailing edge of a sheet M is curled, the resulting order of sheets may be altered.

Figure 6:
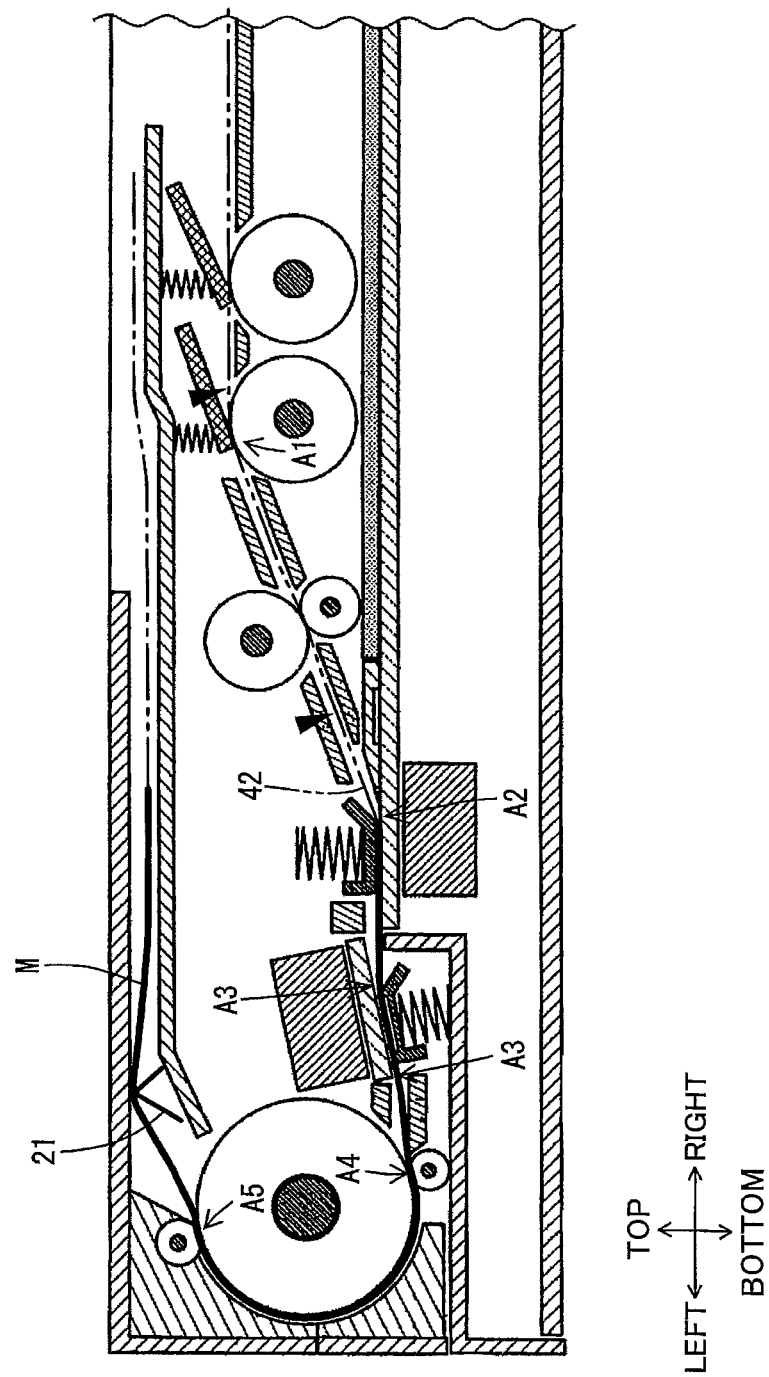
FIG. 6 is a cross-sectional view of the image-reading device in a state where conveyance of a sheet is halted with its trailing edge positioned in segments different from the semicircularly curved segment.

Therefore, when halting conveyance of a sheet M in the preferred embodiment, the control unit 50 stops conveyance when the trailing edge of the sheet M is positioned along the straight segments 42 (the segments between points A1 and A4, for example), as shown in FIG. 6. Here, the urging units 21 described above are urging the sheets M discharged onto the discharge tray 20 upward at a position 5 cm from the trailing edge toward the leading edge of the sheets M. In this case, when halting conveyance of the sheet M, it is desirable to halt conveyance when the trailing edge of the sheet M currently being conveyed is at a position at least 5 cm upstream from the upstream side (point A4) of the semicircularly curved segment 41. In this way, a curl is not formed in the trailing edge portion of the sheet M positioned upstream of the urging units 21 that urge the sheet M upward when the sheet M is discharged onto the discharge tray 20, thereby ensuring that subsequent sheets can be reliably inserted underneath the curled sheet when discharged onto the discharge tray 20.

(7) Read Control Process

Figure 7:
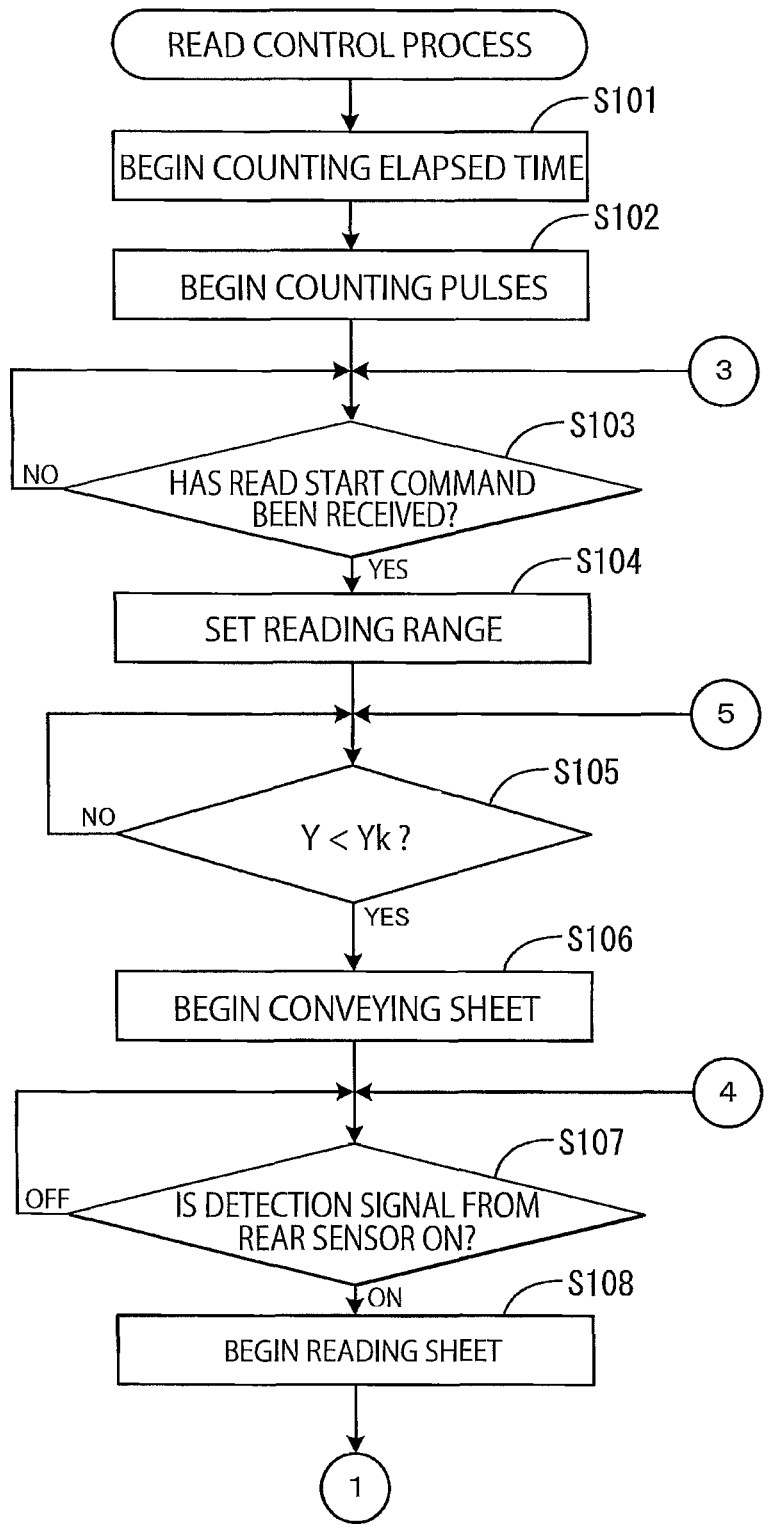
FIGS. 7, 8 and 9 are each a flowchart illustrating steps in a read control process.
Figure 8:
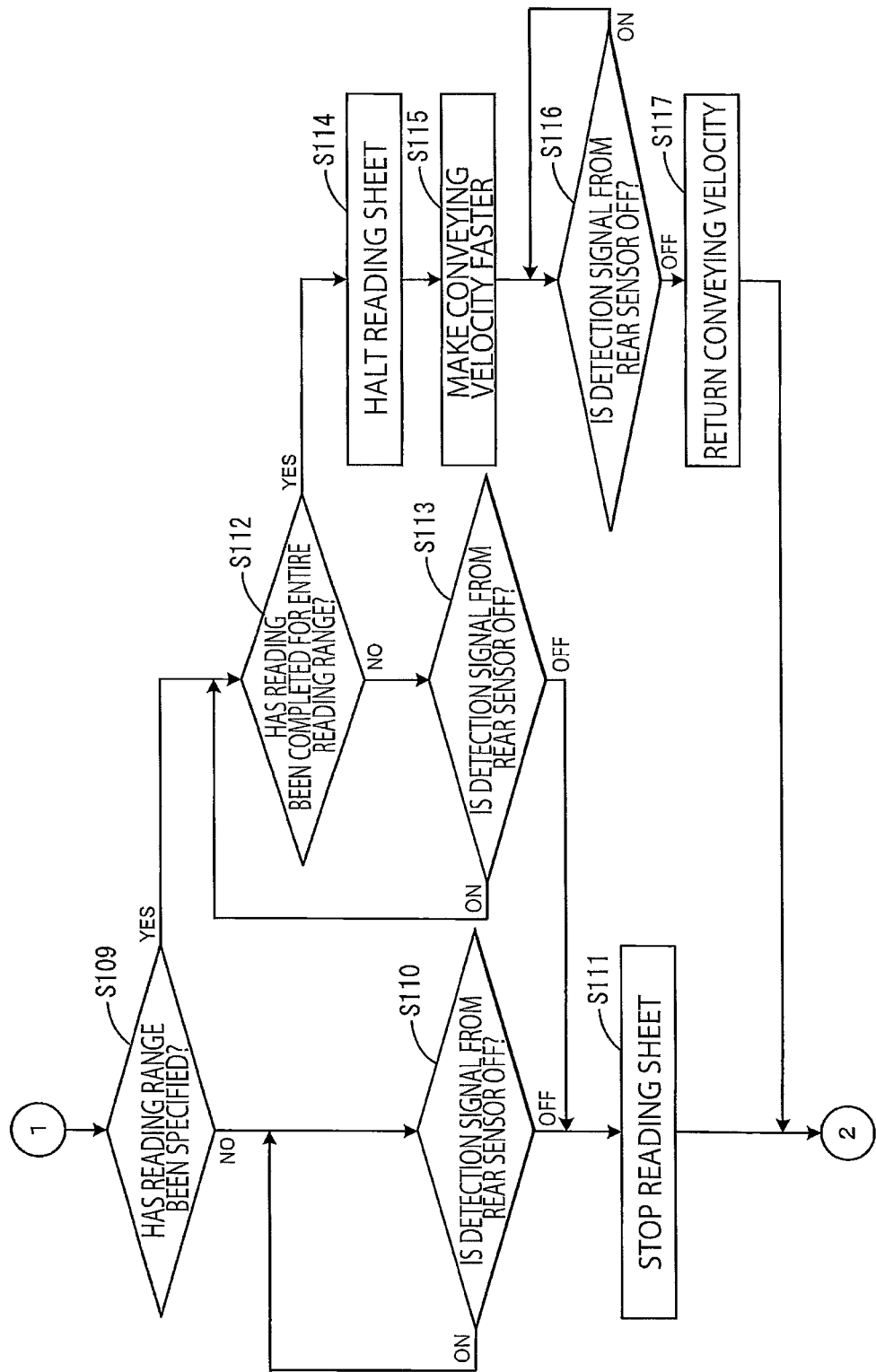
Figure 9:
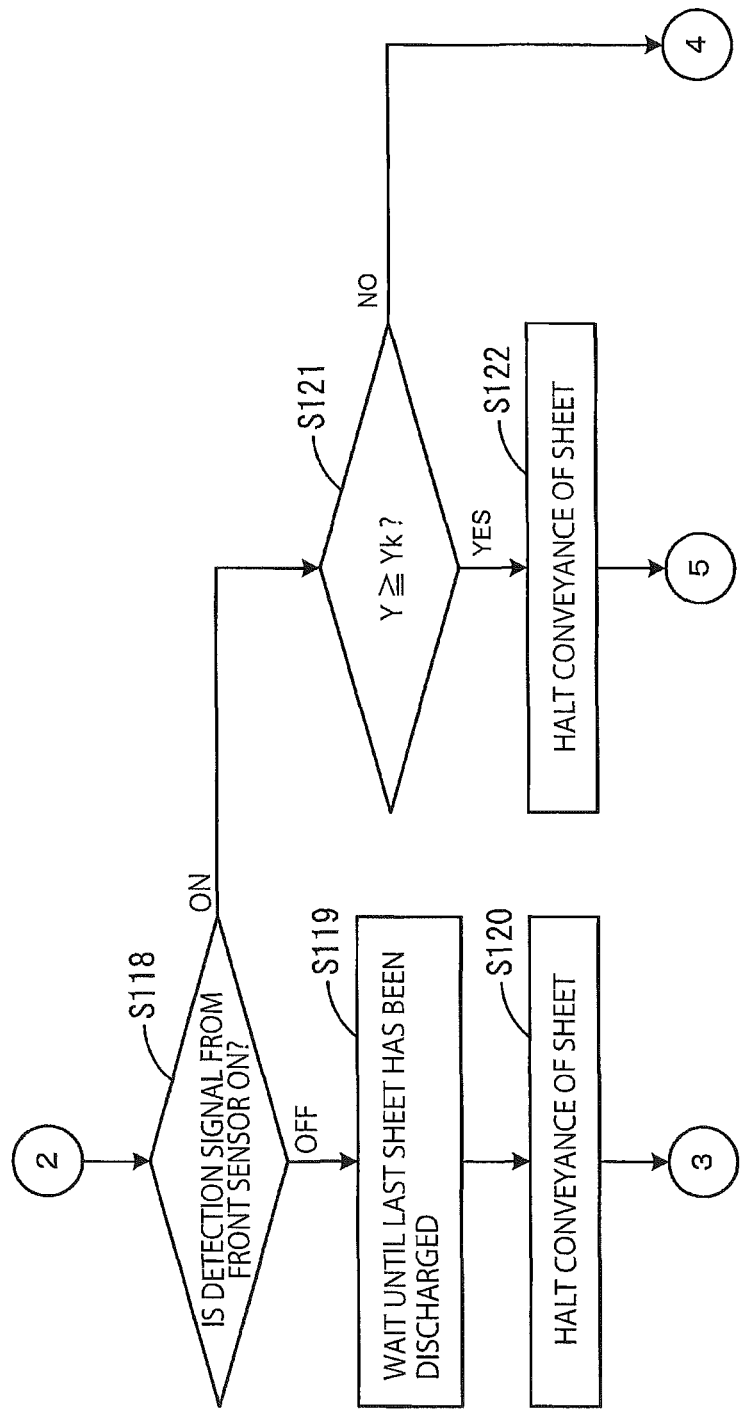
Figure 10:
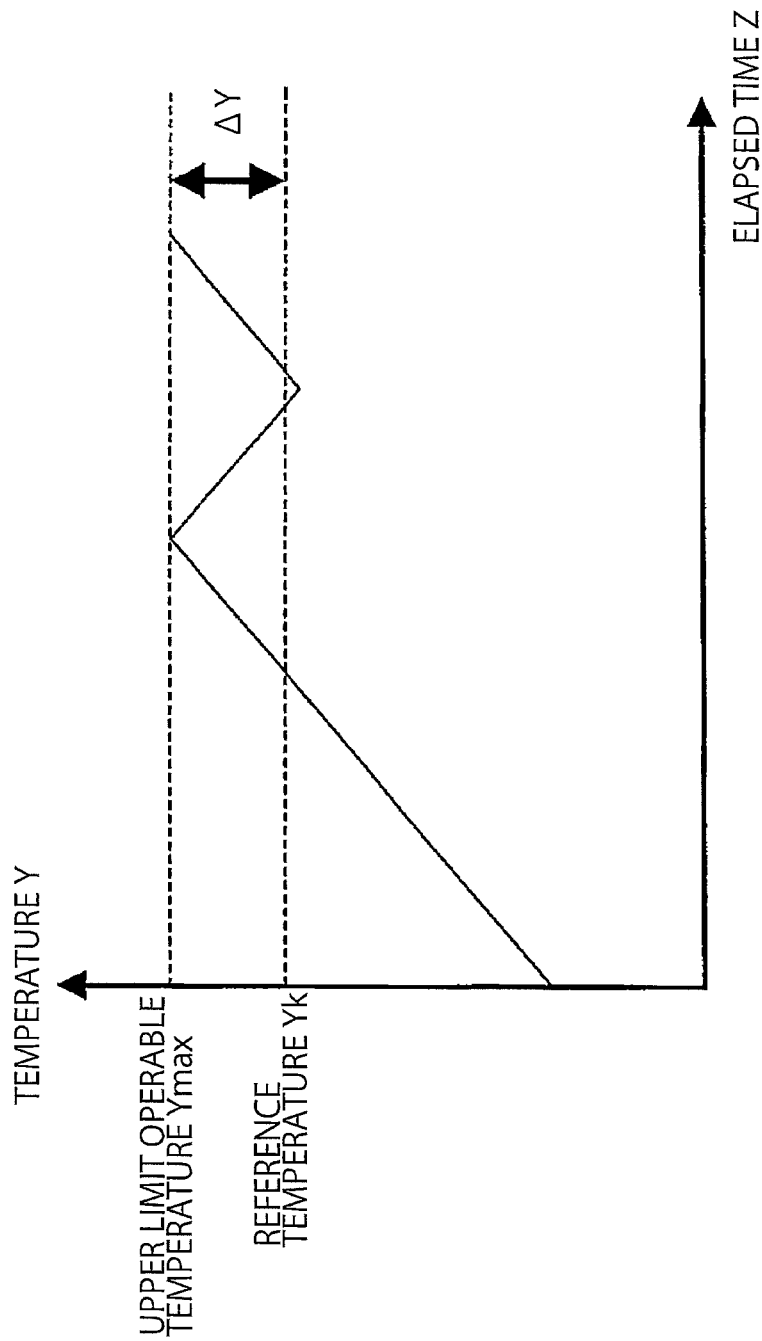
FIG. 10 is a graph for explaining a reference temperature.

Next, the read control process executed by the control unit 50 will be described with reference to FIGS. 7 through 9. The control unit 50 begins executing this process when the power to the image-reading device 1 is turned on. To simplify understanding of this process, the process will be described below using the example of a single-sided reading operation for reading only one surface (first surface) of sheets with the first reading device 13*a*.

In S101 the control unit 50 begins counting the elapsed time from the timing at which the power to the image-reading device 1 was turned on. Specifically, the control unit 50 starts a time counting process as a separate process, for example. In the time counting process, the control unit 50 adds a fixed time length to a variable representing elapsed time, each time the fixed time length has elapsed. Here, the control unit 50 is provided with a real-time clock (RTC) for keeping track of the current time (year, month, day, hour, minute, and second). The control unit 50 stores the time acquired from the RTC when power to the image-reading device 1 is turned on and subtracts this stored initial time from the current time to obtain elapsed time.

In S102 the control unit 50 begins counting pulses of the clock signal inputted into the motor drive circuit 52 from the moment the power to the image-reading device 1 was turned on. Specifically, the control unit 50 starts a pulse counting process for counting pulses of the clock signal as a separate process.

In S103 the control unit 50 determines whether a read start command was received through the operating unit 56. Here, the user operates the operating unit 56 to set reading conditions and subsequently input a read start command. The control unit 50 advances to S104 when a read start command was received through the operating unit 56 (S103: YES) and repeats the determination in S103 after a prescribed delay when a command was not received (S103: NO).

In S104 the control unit 50 sets a reading range. Here, the control unit 50 calculates the pulse number required for conveying the sheet exactly the length of the reading range in the sub-scanning direction based on the reading range specified by the user and stores this pulse count in the RAM 50*c* as the reading range. However, the control unit 50 does not execute the process in S104 when a reading range was not specified.

In S105 the control unit 50 estimates the current temperature Y of the motor 54 by substituting the pulse number of the clock signal inputted into the motor drive circuit 52 and the elapsed time from the time that the power to the image-reading device 1 was turned on into Equation 1. Next, the control unit 50 determines whether the estimated temperature Y is less than the reference temperature Yk. The control unit 50 advances to S106 when the temperature Y is less than the reference temperature Yk (S105: YES), and repeats the determination in S105 after a prescribed delay when the temperature Y is greater than or equal to the reference temperature Yk. Note that if conveyance is resumed as soon as the temperature Y drops below the reference temperature Yk, conveyance will have to be halted immediately thereafter. Accordingly, the control unit 50 should wait until the temperature Y drops at least a prescribed amount below the reference temperature before resuming conveyance.

In S106 the control unit 50 controls the motor drive circuit 52 to convey the sheet. After receiving a command from the control unit 50 to convey the sheet, the motor drive circuit 52 outputs pulses to the motor 54 for rotating the motor 54 until a command to halt conveyance is received. With the motor 54 driving the supply roller 31, separating roller 32, and conveying rollers 34 to rotate, the ADF 30 conveys a plurality of sheets consecutively along the conveying path T with a gap formed between consecutively conveyed sheets.

In S107 the control unit 50 determines whether the detection signal from the rear sensor 17 is on. The control unit 50 advances to S108 upon determining that the detection signal is on (S107: ON), indicating that the leading edge of the sheet has arrived at the detection position of the rear sensor 17, and repeats the determination in S107 after a prescribed delay when the detection signal is off (S107: OFF), indicating that the leading edge has not yet arrived at the detection position.

In S108 the control unit 50 waits until the leading edge of the sheet has arrived at the read position of the first reading device 13a. Once the leading edge has arrived at the read position, the control unit 50 controls the device control unit 51a to begin reading. Here, the control unit 50 can determine whether the leading edge of the sheet has arrived at the read position of the first reading device 13a based on the number of pulses in the clock signal inputted into the motor drive circuit 52 after determining in S107 that the leading edge arrived at the detection position of the rear sensor 17.

In S109 the control unit 50 determines whether a reading range was specified. The control unit 50 advances to S110 when a reading range was not specified (S109: NO) and advances to S112 when a reading range was specified (S109: YES).

In S110 the control unit 50 determines whether the detection signal from the rear sensor 17 is off. The control unit 50 advances to S111 when determining that the detection signal is off (S110: OFF), indicating that the trailing edge of the sheet has arrived at the detection position of the rear sensor 17, and repeats the determination in S110 after a prescribed delay when the detection signal is on (S110: ON), indicating that the trailing edge has not yet arrived at the detection position.

In S111 the control unit 50 waits until the trailing edge of the sheet has arrived at the read position of the first reading device 13a. When the trailing edge has arrived at the read position, the control unit 50 controls the device control unit 51a to stop reading the sheet. Here, the control unit 50 can determine whether the trailing edge of the sheet has arrived at the read position of the first reading device 13a based on the number of pulses in the clock signal inputted into the motor drive circuit 52 after determining in S110 that the trailing edge arrived at the detection position of the rear sensor 17.

In S112 the control unit 50 determines whether reading has been completed for the entire reading range. The control unit 50 can determine whether reading has been completed for the entire reading range by determining whether the number of pulses in the clock signal inputted into the motor drive circuit 52 after the leading edge of the sheet is determined in S108 to have arrived at the read position of the first reading device 13a has reached the pulse number stored in the RAM 50c in S104. The control unit 50 advances to S113 when determining that reading has not been completed for the entire reading range (S112: NO), and advances to S114 when determining that reading has been completed for the entire reading range (S112: YES).

In S113 the control unit 50 determines whether the detection signal of the rear sensor 17 is off. The control unit 50 advances to S111 when the detection signal is off (S113: OFF), indicating that the trailing edge of the sheet has arrived at the detection position, and returns to S112 when the detection signal is on (S113: ON), indicating that the trailing edge has not arrived at the detection position. The purpose of performing this determination will be described next.

In most cases, reading an image over the entire reading range is completed before the trailing edge of the sheet arrives at the detection position of the rear sensor 17. However, in some cases (when the reading range is inadvertently set too long, for example), the trailing edge of the sheet may reach the detection position before reading in the reading range has completed. In such cases, the control unit 50 changes from reading an image over the reading range to reading the entire sheet and advances to S111. In other words, when the trailing edge of the reading range is set to a position within the range on the trailing edge side of the sheet having a length equivalent to the segment of the conveying path from the detection position of the rear sensor 17 to the read position of the first reading device 13a, the reading range setting is cancelled in the first embodiment and the image-reading device 1 reads the entire sheet. This method prevents the image-reading device 1 from continuing the reading operation despite not being able to read the sheet when the user incorrectly sets the reading range to a size greater than the dimension of the sheet for the sub-scanning direction.

In S114 the control unit 50 controls the device control unit 51a to halt the reading operation.

In S115 the control unit 50 controls the device control unit 51a to convey the sheet faster than the conveying velocity used when reading a sheet.

In S116 the control unit 50 determines whether the detection signal received from the rear sensor 17 is off. The control unit 50 advances to S117 when the detection signal is off (S116: OFF), indicating that the trailing edge of the sheet has arrived at the detection position of the rear sensor 17, and repeats the determination in S116 after a prescribed delay when the detection signal is on (S116: ON), indicating that the trailing edge has not arrived at the detection position.

In S117 the control unit 50 controls the device control unit 51a to return the conveying velocity of the sheet to the velocity used for reading a sheet.

In S118 the control unit 50 determines whether the detection signal of the front sensor 16 is on. The control unit 50 advances to S119 when determining that the detection signal is off (S118: OFF), indicating that there are no more sheets to feed, and advances to S121 when determining that the detection signal is on (S118: ON), indicating that there are remaining residual sheets to feed.

In S119 the control unit 50 waits until the last sheet has been discharged onto the discharge tray 20. The control unit 50 can determine whether a sheet has been discharged onto the discharge tray 20 based on the number of pulses in the clock signal inputted into the motor drive circuit 52 after determining in S107 that the leading edge of the sheet arrived at the detection position of the rear sensor 17, for example.

In S120 the control unit 50 controls the device control unit 51a to halt the conveying operation, and subsequently returns to S103.

In S121 the control unit 50 determines whether a halting condition for halting conveyance has been met. More specifically, the control unit 50 estimates the current temperature Y of the motor 54 by substituting the number of pulses in the clock signal inputted into the motor drive circuit 52 and the elapsed time from the moment that the power to the image-reading device 1 was turned on into Equation 1. Next, the control unit 50 determines whether the estimated temperature Y is greater than or equal to the reference temperature Yk. The control unit 50 advances to S122 when the estimated temperature Y is greater than or equal to the reference temperature Yk (S121: YES), satisfying the halting condition, and returns to S107 when the temperature Y is less than the reference temperature Yk (S121: NO), not satisfying the halting condition.

In S122 the control unit 50 controls the device control unit 51a to halt conveyance of the sheet. At this time, the trailing edge of the sheet is at or near the read position of the first reading device 13a. Therefore, conveyance is halted when the trailing edge of the sheet is positioned in the straight segments 42, and particularly in the straight segment between points A2 and A3.

After halting conveyance of the sheet in S122, the control unit 50 returns to S105. In S105 the control unit 50 waits until the temperature Y has dropped below the reference temperature Yk. When the temperature Y has dropped below the reference temperature Yk, the control unit 50 advances to S106 and resumes conveyance.

(8) Reference Temperature

Next, the reference temperature Yk used in the read control process described above will be described with reference to FIG. 10.

When the control unit 50 determines in S118 that the detection signal of the front sensor 16 is off, the control unit 50 can determine that the most recently read sheet is the last sheet to be read. In this case, the control unit 50 advances to S119 without determining whether the halting condition has been met and waits until the last sheet has been discharged onto the discharge tray 20.

Thus, the reference temperature Yk must be set to a temperature lower than an upper limit operable temperature Ymax in order to prevent the temperature Y from exceeding the upper limit operable temperature Ymax before the last sheet has been discharged. Specifically, the reference temperature Yk is set to a temperature no greater than the value obtained by subtracting a temperature increase $\Delta Y$ in the motor 54 from the upper limit operable temperature Ymax of the motor 54, where the temperature increase $\Delta Y$ indicates the amount that the temperature of the motor 54 rises from the point that the trailing edge of the sheet is at the read position of the first reading device 13a until the sheet is discharged onto the discharge tray 20.

Since the halting condition is determined at the same time that the reading operation for the sheet has been completed by the first reading device 13a in the first embodiment, the temperature increase in the motor 54 while a sheet whose trailing edge is at the read position of the first reading device 13a is discharged onto the discharge tray 20 can be considered the temperature increase in the motor 54 from the position of the sheet when the control unit 50 determines whether the halting condition was met until the sheet is discharged onto the discharge tray 20.

(9) Effects of the First Embodiment

The image-reading device 1 according to the first embodiment halts conveyance of a sheet of originals when the trailing edge of the sheet is positioned within the straight segments 42. Therefore, this method prevents the trailing edge of the sheet from being curled into a shape conforming to the semicircularly curved segment 41.

Since the image-reading device 1 halts conveyance of a sheet of originals when the trailing edge of the sheet is positioned within the straight segments 42, the image-reading device 1 can insert the sheet beneath previously discharged sheets more reliably when discharging the sheet.

The image-reading device 1 according to the first embodiment halts conveyance of a sheet of originals when the temperature Y of the motor 54 is greater than or equal to the reference temperature Yk. Accordingly, the image-reading device 1 can suppress overheating of the motor 54 while preventing the trailing edge of the sheet from curling into a shape conforming to the semicircularly curved segment 41.

The image-reading device 1 according to the first embodiment has a first reading device 13a disposed in the straight segments 42 for reading sheets of originals. The control unit 50 determines whether a halting condition has been met after the first reading device 13a has completed reading a sheet. Specifically, the control unit 50 performs this determination in S121 after the sheet has been read in S111. With this configuration, the control unit 50 determines whether the halting condition has been met when the trailing edge of the sheet is positioned in the straight segments 42, enabling the image-reading device 1 to halt conveyance of the sheet while the trailing edge of the sheet is positioned within the straight segments 42.

The image-reading device 1 according to the first embodiment does not determine whether the halting condition has been met after the first reading device 13a has completed reading a sheet of originals and when there are no subsequent sheets remaining in the sheet tray 19. Accordingly, the image-reading device 1 can convey the last sheet of originals without temporarily suspending conveyance.

In the image-reading device 1 according to the first embodiment, the reference temperature Yk is set to a temperature not exceeding a value obtained by subtracting the amount of temperature increase in the motor 54 occurring from the point that the control unit 50 determines whether the halting condition has been met (the position of the sheet when the control unit 50 executes S121) until the sheet has been discharged onto the discharge tray 20 from the upper limit operable temperature Ymax of the motor 54. Therefore, the image-reading device 1 can prevent the temperature of the motor from exceeding the upper limit operable temperature, even while continuing to convey the last sheet of originals onto the discharge tray 20, without determining whether the sheet has met the halting condition.

Second Embodiment

Next, a second embodiment of the present invention will be described while referring to FIGS. 11 and 12. The first embodiment gives an example of an image-reading device 1 that discharges sheets of originals by inserting subsequently discharged sheets beneath previously discharged sheets. However, an image-reading device 2 according to the second embodiment discharges subsequent sheets on top of previously discharged sheets.

Figure 11:
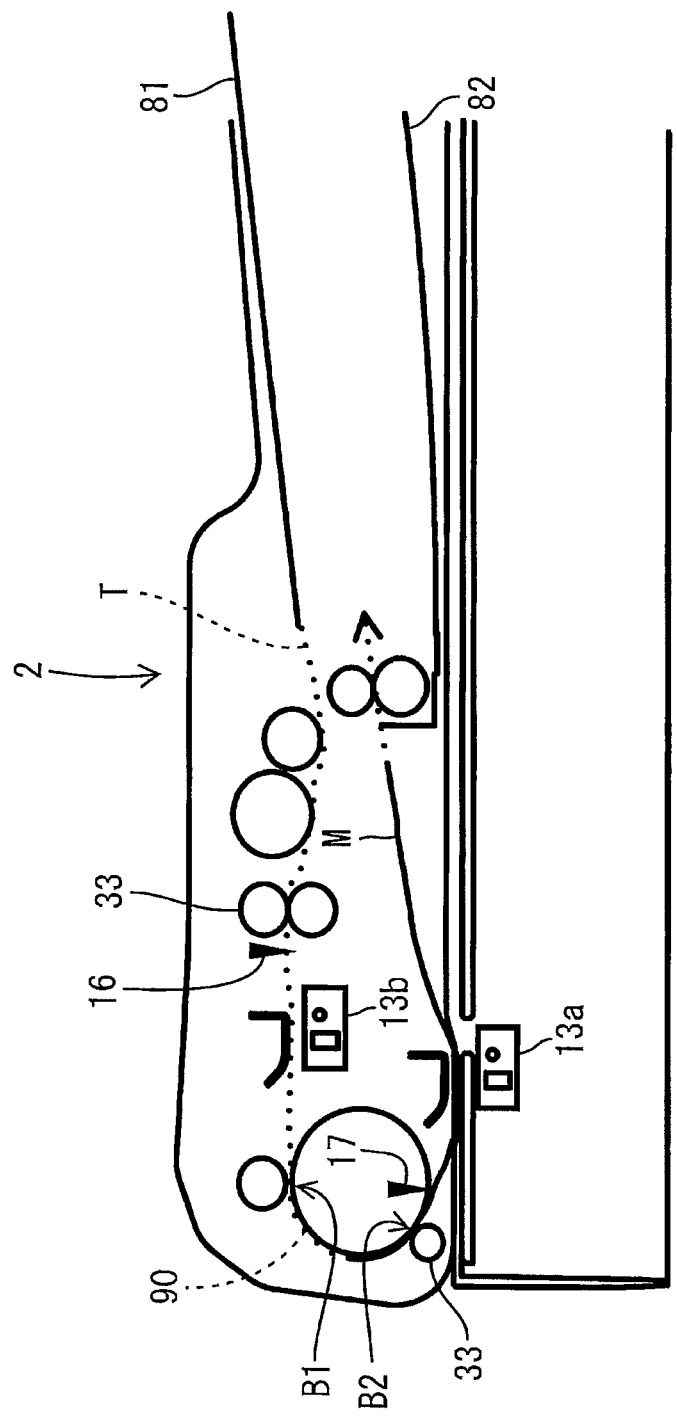
FIG. 11 is a cross-sectional view schematically illustrating a structure of an image-reading device according to a second embodiment.

As shown in FIG. 11, the image-reading device 2 includes a sheet tray 81 disposed above a discharge tray 82. The remaining structure of the image-reading device 2 is essentially the same as the image-reading device 1 according to the first embodiment and, hence, like parts and components are designated with the same reference numerals to avoid duplicating description.

Figure 12:
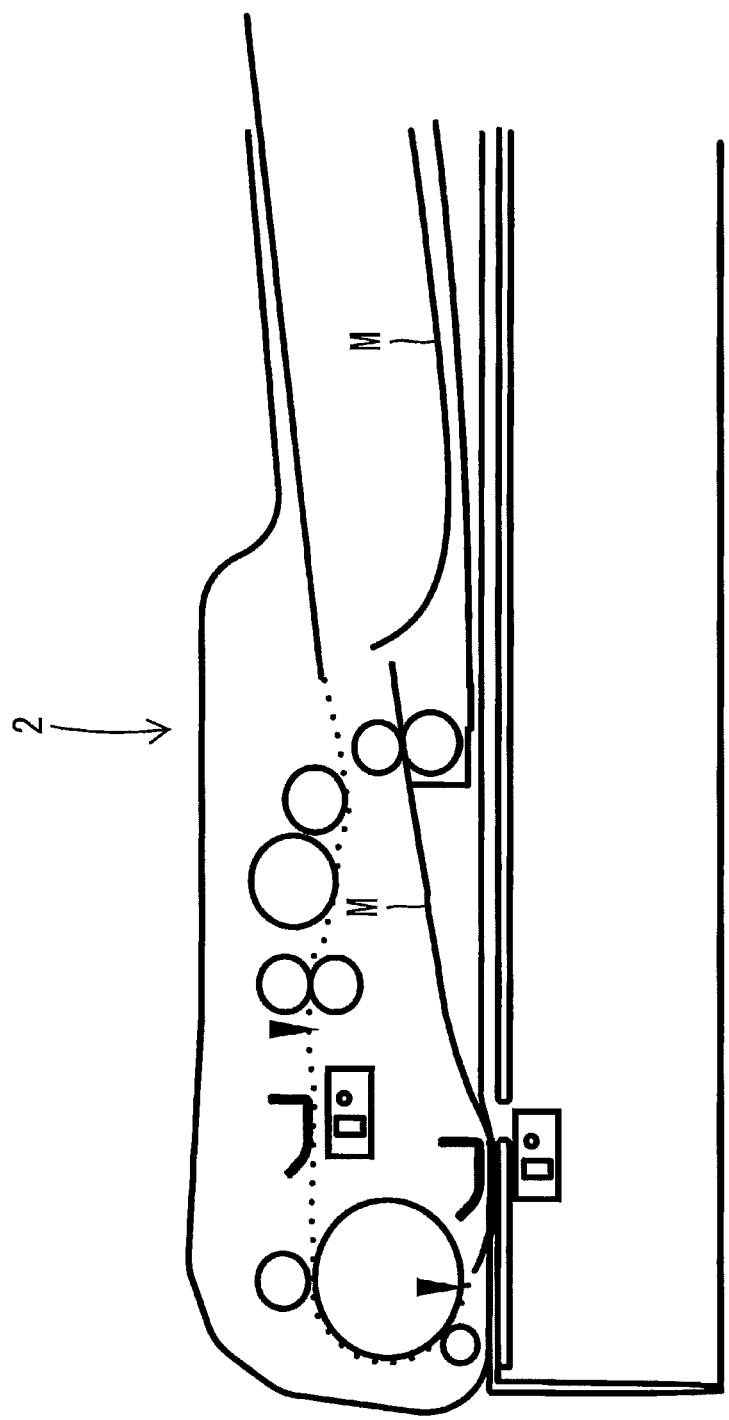
FIG. 12 is a cross-sectional view schematically illustrating a structure of the image-reading device.

With the image-reading device 2 according to the second embodiment, halting a sheet M when the trailing edge of the sheet is positioned in a semicircularly curved segment 90 (the segment between points B1 and B2), as shown in FIG. 11, can result in various problems, such as a subsequently discharged sheet being inserted beneath previously discharged sheets, as illustrated in FIG. 12, a subsequently discharged sheet pushing a previously discharged sheet, or a previously discharged sheet preventing the progress of a subsequently discharged sheet and causing a paper jam.

Accordingly, the image-reading device 2 halts conveyance of a sheet when the trailing edge of the sheet is positioned in a segment of the conveying path T different from the semicircularly curved segment 90. In this way, the image-reading device 2 can prevent the trailing edge of the sheet from curling into a shape conforming to the semicircularly curved segment 90 and, hence, can avoid the problems described above.

In the example of the image-reading device 2 according to the second embodiment, segments of the conveying path T upstream and downstream of the semicircularly curved segment 90 are straight segments. Accordingly, the image-reading device 2 can halt conveyance of a sheet of originals when the trailing edge of the sheet is positioned in the upstream straight segment or in the downstream straight segment.

(1) In the preferred embodiment described above, the segments 42 of the conveying path T excluding the semicircularly curved segment 41 are described as straight segments, but the segments 42 are not limited to straight segments. For example, the segments 42 as a whole may be curved, or the segments 42 as a whole may be mostly straight with a partially curved section.

Further, curl in the trailing edge of a sheet will be of little hindrance to insertion discharging if the curl curves in the opposite direction in curl produced when the trailing edge is halted in the semicircularly curved segment 41 described in the embodiments. Therefore, when the emphasis on the discharge operation is to achieve insertion discharge, i.e., when curl in the trailing edge of the sheets is acceptable, provided that insertion discharge can be completed without hindrance, the straight segments 42 of the conveying path T excluding the semicircularly curved segment 41 may be shaped to produce such curl in the opposite direction in the trailing edge of the sheets.

(2) In the preferred embodiment described above, the condition for halting conveyance is described as the temperature Y of the motor 54 exceeding the reference temperature Yk, but other halting conditions may be employed. For example, conveyance of sheets may be halted when processing of scan data lags behind the scanning operation on the sheets and the RAM 50c storing the scan data becomes full.

(3) The preferred embodiment described above suppresses curl in the trailing edge portion of sheets of originals, but does not necessarily suppress curl in the leading edge of the sheets. However, since it is not particularly desirable to have curl in the leading edge of the sheets, the image-reading device 1 may be prevented from halting a sheet when the leading edge thereof is positioned in the semicircularly curved segment, or may be prevented from halting a sheet when either the leading edge or the trailing edge of the sheet is positioned in the semicircularly curved segment.

(4) The image-reading device 1 according to the preferred embodiment halts a sheet when the trailing edge is positioned in the straight segments 42. However, if the conveying path T includes a curved segment positioned upstream of the straight segments, for example, the image-reading device 1 may be configured to halt a sheet when the trailing edge is positioned in this curved segment. In other words, the sheet may be halted when the trailing edge is positioned in a curved segment other than the semicircularly curved segment 41.

If the image-reading device 1 is configured to determine whether the halting condition has been met when an edge of the sheet is on the downstream side of the straight segments, for example, the image-reading device 1 cannot halt conveyance of the sheet with the edge positioned in the straight segments, should the image-reading device 1 determine that the halting condition has been met. However, by determining whether the halting condition has been met when the edge of the sheet is positioned within or upstream of the straight segments on the conveying path, the image-reading device 1 can halt conveyance of the sheet when the edge is positioned in the straight segments.

(5) The preferred embodiment gives an example of a single-sided reading operation in which the first reading device 13a reads only one surface of the sheets of originals. However, the image-reading device 1 may also perform a duplex reading operation in which the first reading device 13a reads one surface of a sheet and the second reading device 14a reads the other surface of the sheet. In this case, the image-reading device 1 may halt conveyance of the sheet when the trailing edge of the sheet is either at the read position of the second reading device 14a or within the straight segment downstream of the second reading device 14a. In this way, the image-reading device 1 can also halt a sheet undergoing a duplex reading operation when the trailing edge of the sheet is positioned within a straight segment.

(6) The preferred embodiment described above gives an example in which the control unit is configured of a single CPU. However, the control unit may be configured of an application-specific integrated circuit (ASIC), one or more CPUs, or a combination of an ASIC and one or more CPUs.

(7) The preferred embodiment gives an example of a sheet-conveying device provided in an image-reading device. However, the sheet-conveying device of the present invention is not limited to an image-reading device, but may also be provided in a printer, for example.

While the present invention has been described in detail with reference to the embodiments thereof, it would be apparent to those skilled in the art that various changes and modifications may be made therein without departing from the spirit of the present invention.

What is claimed is:

1. A sheet conveying device comprising:
   a conveying unit configured to convey a sheet along a conveying path, the sheet having a leading edge and a trailing edge, the conveying path including a segment that is curved; and
   a controller configured to:
      control the conveying unit to convey the sheet;
      determine whether or not a halting condition for halting conveyance of the sheet is met; and
      halt, if the halting condition is met, conveyance of the sheet when one of the leading edge and the trailing edge of the sheet is positioned in a segment of the conveying path different from the segment that is curved,
   wherein the conveying unit includes a conveying roller and a motor configured to drive the conveying roller to rotate; and
   wherein the halting condition is defined by a temperature of the motor higher than or equal to a reference temperature.

2. The sheet conveying device according to claim 1, further comprising:
   a discharge tray onto which the sheet that is conveyed by the conveying unit is discharged,
   wherein the reference temperature is set to a temperature lower than a value obtained by subtracting a temperature increase in the motor from an upper limit operable temperature of the motor, the temperature increase indicating an amount that the temperature of the motor rises from a timing when the halting condition is determined until the sheet is discharged onto the discharge tray, the upper limit operable temperature being preliminarily set.

3. The sheet conveying device according to claim 1, wherein the conveying path includes a straight segment; and
   wherein the controller halts the conveyance of the sheet when one of the leading edge and the trailing edge of the sheet is positioned in the straight segment.

4. The sheet conveying device according to claim 3, wherein the controller determines whether or not the halting condition is met when one of the leading edge and the trailing edge of the sheet is positioned in the straight segment or on an upstream side of the straight segment in the conveying path.

5. The sheet conveying device according to claim 1, further comprising:
a discharge tray onto which the sheet that is conveyed by the conveying unit is discharged; and
an urging unit configured to urge the sheet discharged onto the discharge tray upward at a position nearer to the trailing edge of the sheet than the leading edge of the sheet,
wherein the controller halts the conveyance of the sheet when the trailing edge of the sheet is positioned in the segment of the conveying path different from the segment that is curved.

6. The sheet conveying device according to claim 1, wherein the conveying path includes a semicircularly curved segment; and
wherein the controller halts the conveyance of the sheet when one of the leading edge of the sheet and the trailing edge of the sheet is positioned in a segment of the conveying path different from the semicircularly curved segment.

7. An image reading device comprising:
a conveying unit configured to convey a sheet along a conveying path, the sheet having a leading edge and a trailing edge, the conveying path including a segment that is curved;
a reading unit that is disposed in a segment of the conveying path different from the segment that is curved and configured to read the sheet; and
a controller configured to:
control both the conveying unit to convey the sheet and the reading unit to read the sheet that is conveyed by the conveying unit;
determine whether or not a halting condition for halting conveyance of the sheet is met when the reading unit has completed reading the sheet; and
halt, if the halting condition is met, conveyance of the sheet when one of the leading edge and the trailing edge of the sheet is positioned in the segment different from the segment that is curved,
wherein the conveying unit includes a conveying roller and a motor configured to drive the conveying roller to rotate; and
wherein the halting condition is defined by a temperature of the motor higher than or equal to a reference temperature.

8. The image reading device according to claim 7, further comprising:
a discharge tray onto which the sheet that is conveyed by the conveying unit is discharged,
wherein the reference temperature is set to a temperature lower than a value obtained by subtracting a temperature increase in the motor from an upper limit operable temperature of the motor, the temperature increase indicating an amount that the temperature of the motor rises from a timing when the halting condition is determined until the sheet is discharged onto the discharge tray, the upper limit operable temperature being preliminarily set.

9. The image reading device according to claim 7, wherein the conveying path includes a straight segment;
wherein the reading unit is disposed in the straight segment; and
wherein the controller halts the conveyance of the sheet when one of the leading edge and the trailing edge of the sheet is positioned in the straight segment.

10. The image reading device according to claim 9, wherein the controller determines whether or not the halting condition is met when one of the leading edge and the trailing edge of the sheet is positioned in the straight segment or on an upstream side of the straight segment in the conveying path.

11. The image reading device according to claim 7, further comprising:
a discharge tray onto which the sheet that is conveyed by the conveying unit is discharged; and
an urging unit configured to urge the sheet discharged onto the discharge tray upward at a position nearer to the trailing edge of the sheet than the leading edge of the sheet,
wherein the controller halts the conveyance of the sheet when the trailing edge of the sheet is positioned in the segment of the conveying path different from the segment that is curved.

12. The image reading device according to claim 7, wherein the conveying path includes a semicircularly curved segment; and
wherein the controller halts the conveyance of the sheet when one of the leading edge and the trailing edge of the sheet is positioned in a segment of the conveying path different from the semicircularly curved segment.

13. The image reading device according to claim 7, wherein the conveying path includes a straight segment;
wherein the sheet has a first surface and a second surface opposite the first surface;
wherein the reading unit is disposed in the straight segment and includes a first reading unit configured to read the first surface of the sheet and a second reading unit configured to read the second surface of the sheet at a position downstream side of the first reading unit in the conveying path; and
wherein the controller halts, if performing a single-sided reading operation in which the first reading unit reads the first surface of the sheet, the conveyance of the sheet when one of the leading edge and the trailing edge of the sheet is positioned in the straight segment downstream of the first reading unit, and halts, if performing a duplex reading operation in which the first reading unit reads the first surface of the sheet and the second reading unit reads the second surface of the sheet, the conveyance of the sheet when one of the leading edge and the trailing edge of the sheet is positioned in the straight segment downstream of the second reading unit.

14. The image reading device according to claim 7, further comprising:
a sheet tray configured to load a plurality of sheets; and
a detecting unit configured to detect a sheet in the sheet tray,
wherein the conveying path further includes a straight segment;
wherein the conveying unit conveys the plurality of sheets loaded in the sheet tray one by one;
wherein the reading unit is disposed in the straight segment and reads the plurality of sheets conveyed by the conveying unit one by one;
wherein the controller is further configured to:
control the detecting unit to detect a sheet in the sheet tray when the reading unit has completed reading a sheet; and
judge whether or not a sheet is present in the sheet tray; and
wherein the controller determines whether or not the halting condition is met when a sheet is present in the sheet tray.

* * * * *